United States Patent
Williams

(10) Patent No.: US 8,862,682 B2
(45) Date of Patent: Oct. 14, 2014

(54) ACCELERATED SOCKETS

(75) Inventor: James B. Williams, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 1246 days.

(21) Appl. No.: 12/707,594

(22) Filed: Feb. 17, 2010

(65) Prior Publication Data

US 2011/0202623 A1    Aug. 18, 2011

(51) Int. Cl.
*G06F 15/16* (2006.01)
*H04L 29/06* (2006.01)

(52) U.S. Cl.
CPC .................. *H04L 69/162* (2013.01)
USPC .......................... 709/207; 709/227

(58) Field of Classification Search
CPC ..................................... H04L 69/162
USPC .................................. 709/207, 227
See application file for complete search history.

(56) References Cited

U.S. PATENT DOCUMENTS

| 2002/0075844 | A1* | 6/2002 | Hagen | 370/351 |
| 2006/0268689 | A1* | 11/2006 | Tarraf et al. | 370/229 |
| 2010/0088398 | A1* | 4/2010 | Plamondon | 709/220 |

* cited by examiner

*Primary Examiner* — Yves Dalencourt
(74) *Attorney, Agent, or Firm* — McAndrews, Held & Malloy, Ltd.

(57) ABSTRACT

An improved method of using sockets in connection with TCP over certain local networks, such as the enhanced Ethernet. In particular, an accelerated socket protocol is provided to enhance data communications between different host computer systems connected to an enhanced Ethernet network. Under the accelerated socket protocol, a host computer, while sending a number of data packets, is able to indicate a particular data packet is a last ready data packet out of all packets ready to be sent by setting a PUSH bit in that particular data packet, which triggers an automatic acknowledgement message that confirms receipt of data from the receiver. In addition, while receiving data packets, the host computer can advertise an effective window that corresponds to the actually available receiving space in the host computer.

36 Claims, 6 Drawing Sheets

ACCELERATED SOCKETS

FIELD OF THE INVENTION

This generally relates to computer networking and communications, and more particularly, to enhanced data communications over certain local networks, such as the Enhanced Ethernet, by use of accelerated socket interfaces.

BACKGROUND OF THE INVENTION

Socket technology, as one of the most fundamental technologies of computer networking, has been employed for roughly two decades. A socket represents a single bidirectional connection between two pieces of software or applications, which allows either side of the connection to send and receive data. Usually socket-based software runs on two separate computers over a network, although sockets can also be used to communicate locally within a single computer, i.e., inter-process communications. The implementation of sockets can be based on standard mechanisms built into network hardware and operating systems, such as code libraries packaged with the operating system. Several libraries exist for implementing socket Application Programmable Interfaces (APIs), among which the first mainstream socket library is called the Berkeley Sockets API. These code libraries provide various functions for creating and using sockets. For example, socket ( ) is used to create a new socket of a certain socket type, connect ( ) is used to assign a free local port number to a socket, and the functions of send ( ) and receive ( ) are used for sending and receiving data to/from a remote socket.

Socket interfaces can be divided into three categories. The most commonly-used type, stream socket, implements connection-oriented semantics. Essentially, a "stream" requires that the two communicating parties first establish a socket connection, after which any data passed through that connection will be guaranteed to arrive in the same order in which it was sent. In comparison, the second type, datagram socket, offers connection-less semantics. With datagrams, connections are implicit rather than explicit as with streams. Either party simply sends datagrams as needed and waits for the other to respond. This means, messages can be lost in transmission or received out of order, and the socket is not configured to address these problems. In general, datagram sockets provide more flexibility as compared to stream sockets. The third type of socket is called raw sockets, which bypasses the built-in support for standard protocols such as Transmission Control Protocol (TCP) and User Datagram Protocol (UDP). Raw sockets are often used for custom low-level protocol development.

Today, sockets are typically used in conjunction with various Internet protocols, including Internet Protocol (IP), TCP and UDP. The combined use of sockets and TCP may be ideal for unreliable wide area networks, but in a semi-reliable local area network, such as the enhanced Ethernet with growing popularity in enterprise data centers, there are quite a few disadvantages due to certain specific algorithms under TCP. For instance, TCP uses a slow start algorithm to avoid congestion when data transmission is started. However, this can be unnecessary in the context of the enhanced Ethernet that already provides congestion management. Also, certain applications require high bandwidths for data transfer or involve frequent stops and starts in data transmission (e.g., file system or disk storage protocols). The use of slow start algorithm under TCP may compromise or even conflict these requirements. Similarly, the congestion avoidance algorithm in TCP may be unnecessary in view of the congestion management provided in the enhanced Ethernet protocol. As another example, TCP allows data packets to be received out of order, which typically occurs when some packets are being dropped due to network congestion or packet reordering in the network. According to the TCP protocol, the out-of-order packets would be buffered and put back in order when the dropped packets are resent and received. This may create significant complexity and memory overhead in Network Interface Cards (NICs) in support of TCP operations. In contrast, in the enhanced Ethernet, out-of-order packets are simply dropped, thereby avoiding any buffering and the associated overhead.

In view of the above, there is a need for an improved method of using sockets in connection with TCP over certain local networks, such as the enhanced Ethernet, to ensure efficient data transfer and communications within the network.

SUMMARY OF THE INVENTION

Embodiments of the present invention relate to an improved method of using sockets in connection with TCP over semi-reliable local networks, such as the enhanced Ethernet, to ensure efficient data transfer and network communications thereof. In one embodiment, provided is a method for enhancing data communications between a first computer and a second computer connected therewith via a computer network, which comprises the steps of: advertising receiving space in the second computer to the first computer, the receiving space comprising one or more receive buffers posted by a receive application at the second computer; transmitting a plurality of data packets from the first computer to the second computer over the computer network, wherein the plurality of data packets are received in a few buffers to be returned to the receiving application; and advertising updated receiving space at the second computer to the first computer, the updated receiving space comprising the one or more receive buffers posted by the receiving application excluding the few buffers returned to the receiving application, wherein the updated receiving space is advertised concurrently with sending an acknowledgement message of receiving the data packets. Computer-readable storage medium comprising computer-executable instructions for executing one or more steps of the above method is also provided according to various embodiments of the invention.

Another embodiment of the invention provides a method for enhancing data communications between computers connected to a computer network. Such a method comprises: transmitting a plurality of data packets from a first computer to a second computer over the computer network; setting a PUSH bit in one data packet amongst the plurality of data packets to indicate the one data packet is a last ready packet out of all data packets ready to be sent from the first computer before a break; sending an acknowledgement message to confirm receipt of the one data packet with the PUSH bit set therein at the second computer; and after receiving the acknowledgement message at the first computer, re-assuming data transmission from the first computer to the second computer.

Yet another embodiment of the invention provides a network interface controller implemented in a network capable device, wherein the network interface controller configured for: establishing a network connection between the network capable device and a receiver over a computer network; posting transmit buffers on the network connection for a sending application in the network capable device; transmitting a plurality of data packets from the transmit buffers to the receiver over the computer network; and setting a PUSH bit in one data packet amongst the plurality of data packets to indicate the one data packet is a last ready data packet out of all data packets ready to be sent from the sending application.

Also, according to one embodiment of the invention, a host computer system connected to a computer network comprises a host processor configured to execute one or more host applications; a host memory accessible to the host processor, the host memory comprising a plurality of data buffers; and a network interface controller coupled to the host processor, the network interface controller configured to enable a network connection between the host computer system and the computer network, the network interface controller further configured for: posting transmit buffers for a sending application in the host computer system; transmitting a plurality of data packets from the transmit buffers to a receiver over the computer network; and setting a PUSH bit in one data packet amongst the plurality of data packets to indicate the one data packet is a last ready data packet out of all data packets ready to be sent from the sending application.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to an improved method of using sockets in connection with TCP over semi-reliable local networks, such as the enhanced Ethernet, to ensure efficient data transfer and network communications thereof. Particularly, an accelerated socket protocol is provided, for which a PUSH bit used in conventional protocols such as TCP is re-defined so as to enhance communications between different host computer systems connected to an enhanced Ethernet network. According to the accelerated socket protocol, a host computer, and more specifically, through a network interface controller (NIC) implemented therein, while sending a number of data packets, is able to indicate a final data packet by setting the PUSH bit and thereby invite an automatic acknowledgement confirming receipt of data from the receiving computer. In addition, the accelerated socket protocol allows a host computer, while receiving data packets, to advertise an effective window that always correspond to the actually available receiving space of posted receiving buffers in the host computer. As compared to conventional sockets and TCP protocols, the accelerated sockets according to various embodiments of the invention not only improve the performance but also reduce cost in hardware implementations. In addition, from the software standpoint, the use of accelerated socket stacks can significantly lower the overhead in a host computer.

Although embodiments of the invention may be described and illustrated herein in terms of socket APIs in conjunction with the TCP protocol over the enhanced Ethernet, it should be understood that embodiments of this invention are not so limited, but may additionally be applied in the context of other protocols, such as iSCSI, CIFS and NFS, as applied in semi-reliable local networks. In addition, embodiments of the invention essentially allows a receiving computer to advertise a window equal to the size of receive buffers posted by the receiving application and keep the sending computer in synchronization in the event that a partially-filled buffer is returned to the receiving application. Although these embodiments of the invention may be described and illustrated herein using specific mechanisms such as the PUSH bit, it should be understood that many other mechanisms can be employed for the same or similar purposes without departing from the spirit of the invention.

Figure 1:
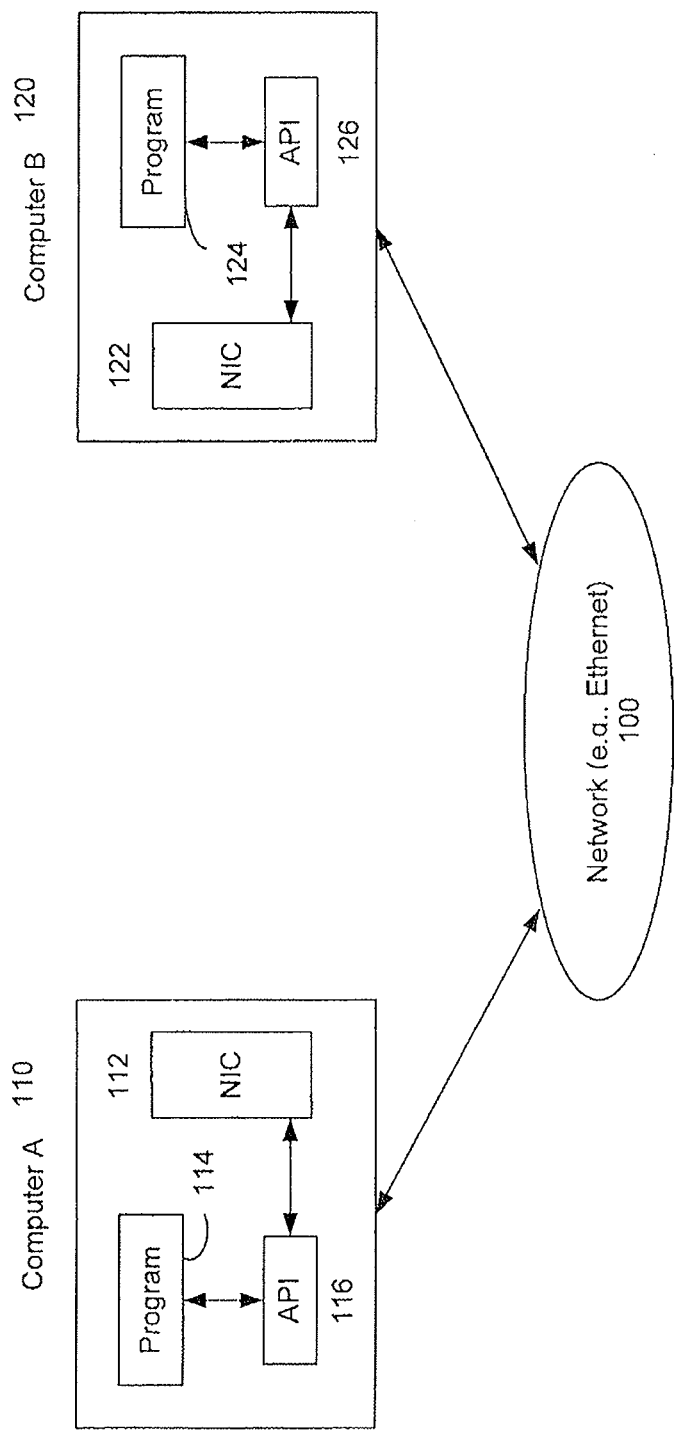
FIG. 1 provides a high-level overview of an exemplary network configuration for implementing various embodiments of the present invention.

Referring to FIG. 1, an exemplary network configuration for implementing various embodiments of the present invention will be described. It should be understood that FIG. 1 only shows a high-level overview of the network configuration for which various hardware and software components (not shown in FIG. 1) can be included in actual implementations. As shown in FIG. 1, two exemplary host computers 110 and 120 are connected to a network 100, such as an Enhanced Ethernet network. The communications between the two host systems over the network may involve various network protocols, such as TCP/IP, Fibre Channel, Ethernet and FCoE (Fibre Channel over the Ethernet) protocols.

Within the host computer A 110, there is a Network Interface Controller (NIC) 112, which is a hardware interface for handling the network connectivity between the host computer 110 and other elements on the network, for example, another host computer 120. The NIC 112 has a ROM chip with a unique Media Access Control (MAC) address burned therein. The MAC address, typically a 48-bit serial number, identifies the vendor MAC address within the LAN. Through the MAC address the NIC 112 provides a low-level addressing system. The NIC 112 also provides physical access to a networking medium, as it exists on both the "Physical Layer" and "Data Link Layer" of the OSI model. The NIC 112 is generally configured with one or more data transfer techniques, such as data polling, programmed I/O or interrupt-drive I/O, and DMA (Direct Media Access), etc. In some circumstances, a TCP Offload Engine (TOE) is implemented in the NIC to facilitate data transfer between host systems over the network. Specifically, the TOE offloads processing of the entire TCP/IP stack to the network controller. TOEs are primarily employed with high-speed network interfaces, such as gigabit Ethernet, where processing overhead of the network stack can be significant. However, the inclusion of TOE in every NIC also increases the implementation cost significantly.

The host computer 110 also includes one or more host applications or programs 114 having data communications with components within or outside the host computer 110. To facilitate these communications, particularly the communications with the NIC 112, and further, with the network, a networking Application Programmable Interface (API) 116 is often implemented, which, for instance, can be one of the conventional socket interfaces as discussed above.

Similar to the host computer A 110, the other host computer B 120 also contains a NIC 122, a host application or program 124 and an API 126 connected thereto. It should be understood that although only two computers are illustrated in FIG. 1, embodiments of the invention are not so limited and can include any number of computers or host systems connected to the network.

Figure 2:
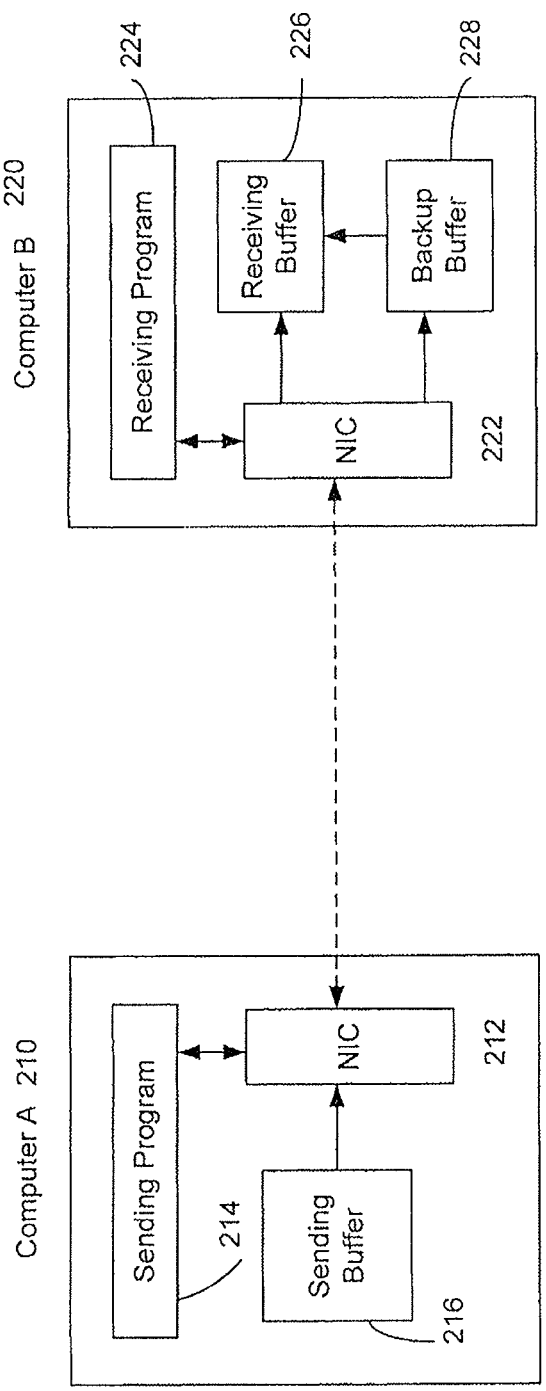
FIG. 2 is a block diagram presenting an overview of socket-based data transmission between two exemplary applications connected to the network of FIG. 1 according to various embodiments of the present invention.

Further to the exemplary network configuration in FIG. 1, an overview of socket-based data transmission between the two host computers, or more particularly, the two host applications, is exemplified in FIG. 2 according to various embodiments of the present invention. It should be noted that in FIG. 2, although the application in computer A 210 is shown as a Sending Program 214, while the application in computer B 220 is shown as a Receiving Program 224, such showings are for illustration purposes only and do not define or in any way limit the scope of various embodiments of the invention. In practice, both computers can host sending and receiving programs and the data transmissions between the two computers can be two-way simultaneously over the network.

As shown in FIG. 2, between the two host computers 210 and 220, the NIC 212 and the NIC 222 communicate with each other over the network (not shown) in terms of transferring data and translating between different protocols. Within the computer A 210, the Sending Program 214 is coupled with the NIC 212 and configured to transmit data through the NIC 212 to a destination device over the network, for example, the Receiving Program 224 in computer B 220. A sending buffer 216 is usually posted by the Sending Program 210 in the computer A 210 for storing data to be sent out to the network. On the receiving end, the computer B 220 has a receiving buffer 226 for storing data received from the computer A 210, as well as a backup buffer 228 for storing an overflow of the received data when the receiving buffer 226 is full.

Figure 3:
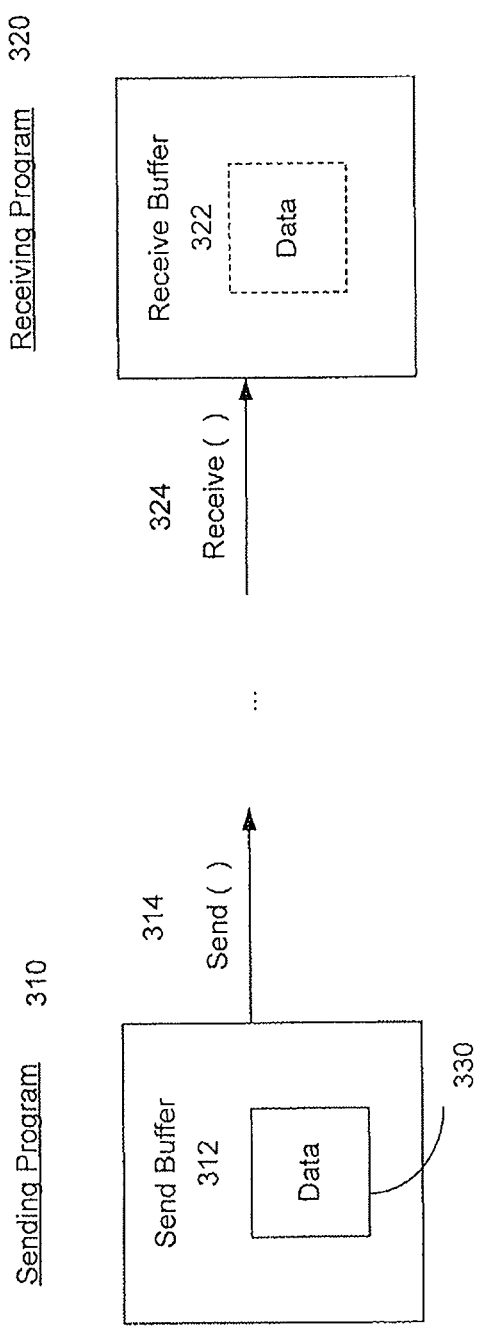
FIG. 3 is a block diagram providing a detailed view of socket-based data transmission between two exemplary applications connected to the network of FIG. 1 according to various embodiments of the present invention.

Ideally, the data from the sending buffer 216 should be able to be exported to the NIC 212 and thereafter directly placed into the receiving buffer 226 over the network in order to achieve the most efficient zero-copy data transmission. However, for many applications, the data transfer process involves copying at least part of the received data. In fact, under the conventional TCP operations, a significant amount of processor time is consumed for copying received data from the system packet buffers to the application receiving buffer. When the amount of data requested by the receiving program is large, it is preferable to hold the data in the sending buffer until it is requested. But if the amount of data to be transferred is small, it is desirable to copy the data and avoid the expensive context switches, since the copying step can be done almost synchronously within a socket receive or read call, as shown in FIG. 3 below. In some instances, the receiving end may first read a small amount of header data to determine the information regarding the payload, such as the type of payload and destination of payload, and store the data in a temporary buffer, while the remaining large amount data is left at the sending end until the receiver requests it.

FIG. 3 provides a detailed view of data transmission between a sending program 310 and a receiving program 320 using socket calls. As illustrated in FIG. 3, at the sending end, a socket send function 314—send ( )—may be called to start sending data 330 from the send buffer 312. Correspondingly, a socket receive function 324—receive ( )—can be called to begin receiving the data 330 into the receive buffer 322. During the data transfer, it is important to know whether the receive buffer is ready for receiving data and/or how much space is available in the receive buffer. The windowing scheme under TCP allows the receiving program to proactively advertise to the sending program how much data it may send. However, under the TCP windowing scheme, sometimes it is necessary to return a partially-filled receive buffer to the receiving program. As a result, the remaining unfilled portion of the buffer will be lost and no longer available for received data, although such space has already been advertised as part of the window.

Figure 4:
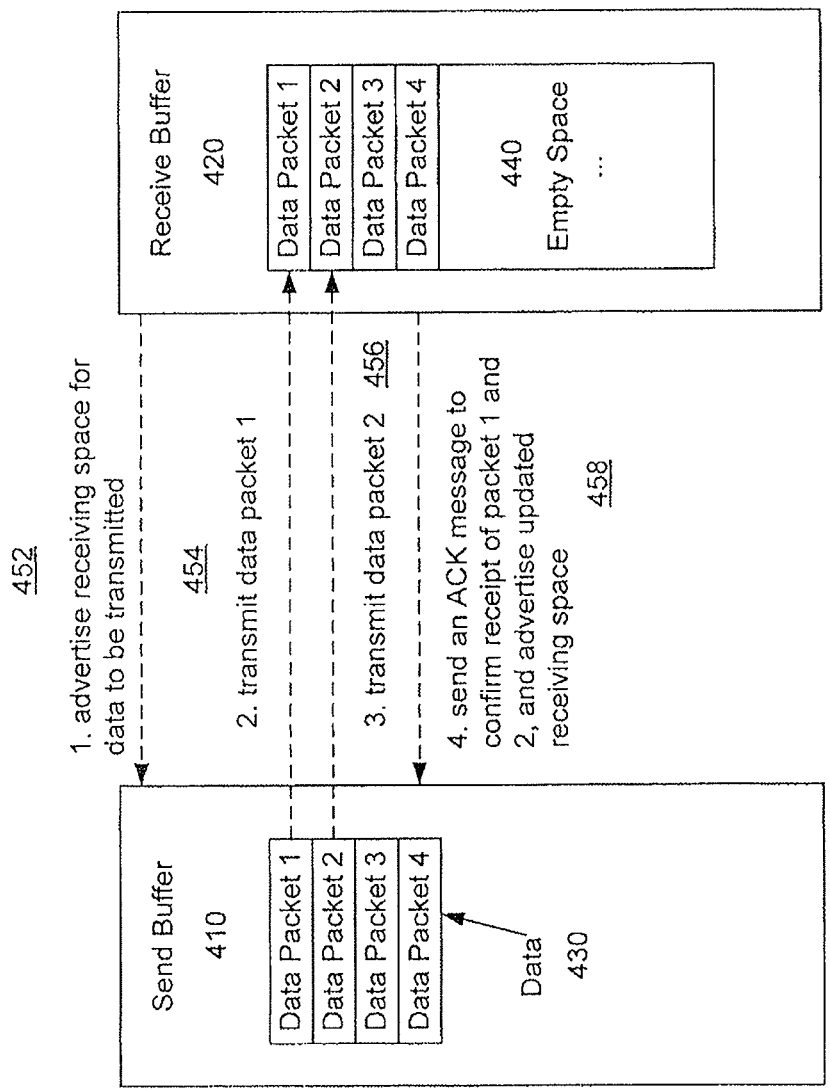
FIG. 4 is a block diagram demonstrating an exemplary data transmission protocol between two exemplary applications connected to the network of FIG. 1.

The above-stated problem can be further demonstrated in the data transmission process in FIG. 4, which involves transferring data 430 from the send buffer 410 of one host computer to the receive buffer 420 of another host computer over the network. As seen in FIG. 4, the data 430 comprises a plurality of data packets, each capable of being packed in the payload of a frame to be transferred under a networking protocol, such as TCP. The data transfer process starts at step 452, where the receiving end or receiver first advertises to the sending end or sender how much receiving space it has for receiving data. Typically, the receiving application posts one or more receive buffers whose total space is to be advertised to the sender. As shown in FIG. 4, after all the data 430 is transferred into the receive buffer 420, there may be unfilled space 440, and such unfilled space will be lost once the receive buffer is returned to the receiving application upon completion of receiving all data packets. However, the sender is unaware of the space loss and may keep sending additional data based on the initially-advertised buffer space. The Socket Direct Protocol (SDP) allows the receiver to update the sender on the buffer change, but this solution can be complicated and expensive, as shown below in step 458.

Back to the data transfer process, at step 454, after the sender is informed of the buffer space, it starts transmitting the first data packet over the network to the receiver. Then the sender continues to send one or more data packets to the receiver at step 456. For reliable data transmission and delivery, most protocols require an acknowledgment from the receiver regarding the received data. As an example, TCP requires the receiver send an acknowledgement message every two received data packets. Thus, at step 458, the receiver sends an acknowledgement (ACK) message to confirm receipt of the data packets. Concurrently with sending the ACK message, the receiver may also advertise the updated receiving space to the sender. However, as mentioned above, it can be complicated to dynamically calculate the remaining receiving space in the receive buffer. Also, there can cause significant time overhead each time the updated space is reported along with the acknowledgement message because the acknowledgement of data receipt can be required as frequent as every two data packets.

Figure 5:
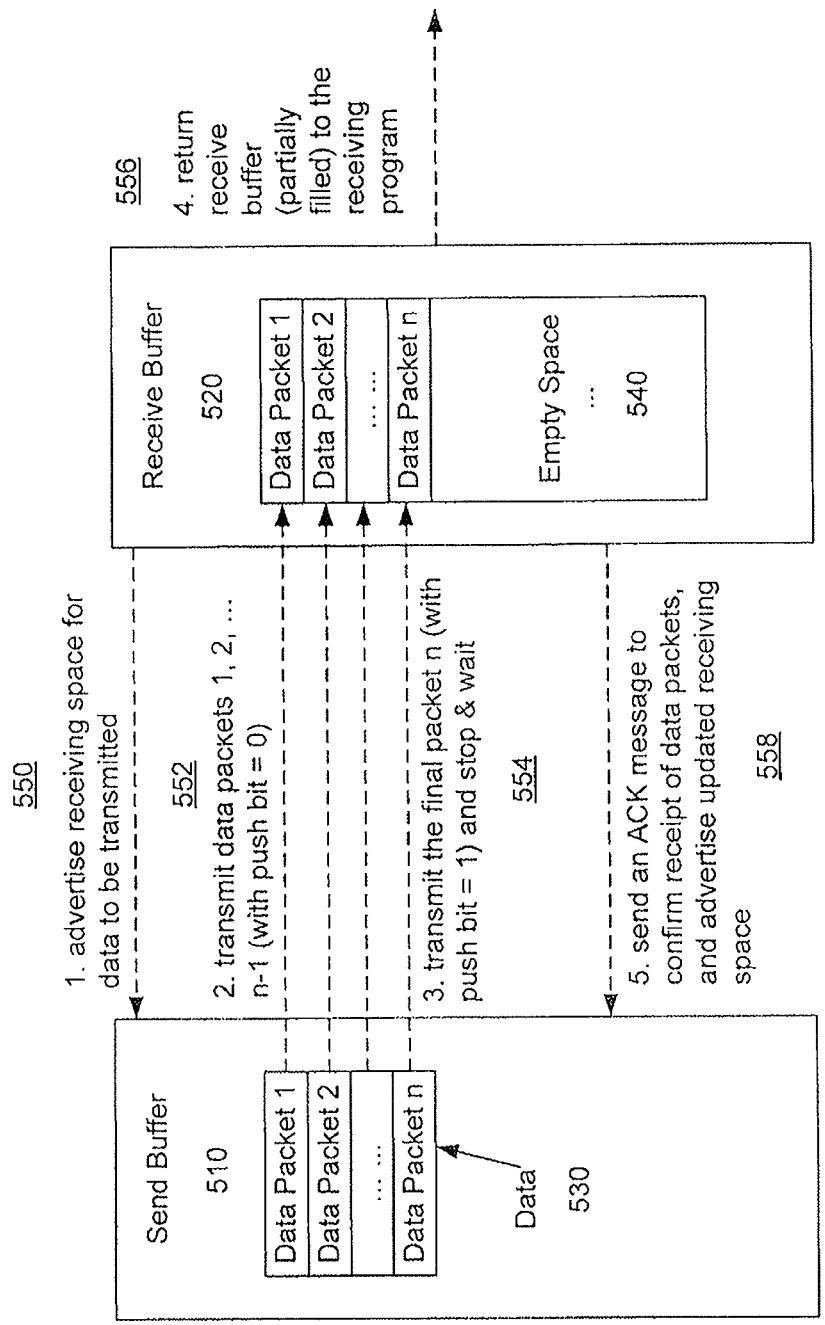
FIG. 5 is a block diagram showing an alternative data transmission protocol using accelerated sockets between two exemplary applications connected to the network of FIG. 1 according to various embodiments of the present invention.

FIG. 5 shows an alternative data transmission protocol using accelerated sockets according to various embodiments of the present invention. In transferring data 530 from the send buffer 510 to the receive buffer 520, the process starts at step 550 where, similar to the process in FIG. 4, the receiver first advertises to the sender how much space is available in its receive buffer for receiving data from the send buffer. A PUSH bit used in TCP data packets is redefined according to the accelerated socket protocol. Specifically, the sender can set the PUSH bit to indicate that it is sending the last data packet out of all the data packets to be sent to the receiver. In other words, the data packet with a PUSH bit set will be followed by a break before any additional data becomes ready for transmission in future. For example, at step 552, the sender can keep sending data packets, e.g., data packet 1, 2, 3, . . . n−1, with the PUSH bit therein not being set, e.g., the PUSH bit having a value of zero (0) or off. When the final data packet is transmitted at step 554, the sender sets the PUSH bit of the packet, e.g., the PUSH bit having a value of one (1) or on. Meanwhile, the sender stops sending any data and waits for the acknowledgement of data receipt from the receiver. Based on the PUSH bit of the received packet, the receiver can determine whether this packet is the final data packet and if so, at step 556, returns the receiver buffer to the receiving application, notwithstanding the unfilled space in the buffer. At step 558, the receiver acknowledges receipt of the data 530 by sending an ACK message back to the sender, along with another advertisement of the reduced receiving space or window. As such, the effective window seen by the sender always corresponds to the available space in the receiving buffers. As can be seen from the above-described protocol, the transmission efficiency is not compromised by the acknowledgement of data receipt.

Figure 6:
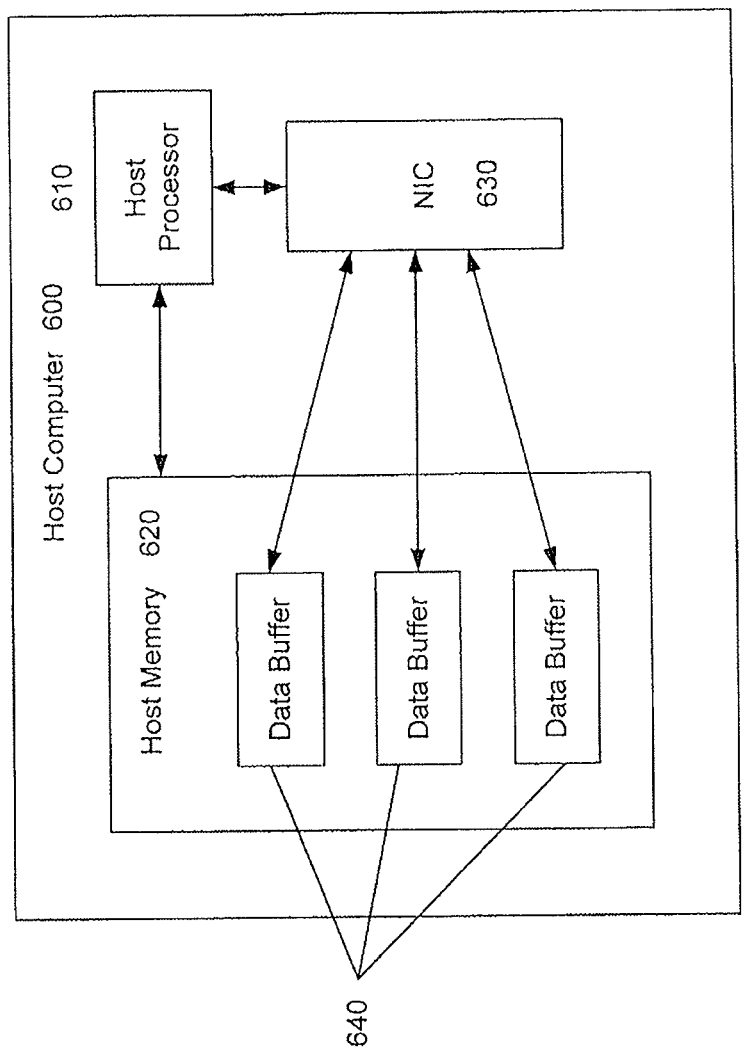
FIG. 6 is a block diagram of an exemplary host computer for implementing various embodiments of the present invention.

FIG. 6 is a block diagram of an exemplary host computer for implementing various embodiments of the present invention. As shown in FIG. 6, a host computer 600 comprises a host processor 610 configured for processing data, a host memory 620 for storing data, and a NIC 630 for managing the network access of the host computer. The host processor 610 communicates with the NIC 630 in terms of various commands involving data exchange. The host memory 620 comprises a number of data buffers 640 accessible to both the host processor 610 and the NIC 630. Each data buffer 640 may hold data to be sent from the host computer 600 to other computers connected to the network, or data to be received from other computers over the network, depending on the data flow context. The NIC 630 can be any standardized network interface card, or be modified in order to efficiently implement specific protocols, such as the above-described accelerated socket protocol. In that case, some low-level protocol processing is offloaded to the NIC. For example, the NIC may be loaded with certain control mechanisms to allow connections to be set up and torn down. Additionally, the NIC is configured for posting transmit buffers as well as receive buffers on an established network connection so that while sending data, the NIC can complete the transmit buffers to the host computer once all the data has been fully sent and acknowledged, and while receiving data, the NIC can place received data in the receive buffers and notify the host computer that the buffers are filled or partially filled. Because the advertised window is usually a bit larger than the posted receive buffers, the NIC is also configured for posting small anonymous buffers for holding any excess data resulting from the window difference.

In practice, the methods, processes or steps described herein may constitute one or more programs made up of machine-executable or computer-executable instructions. The above description with reference to the flowcharts in FIGS. 5 and 6 enables one skilled in the art to develop such programs, including such instructions to carry out the operations represented by logical blocks on suitably-configured processors. The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. The present invention is not described with reference to any particular programming language, but it will be appreciated that a variety of programming languages may be used to implement the teachings of the invention as described herein. Furthermore, it is common in the art to speak of software, in one form or another (e.g., program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable medium" or "machine readable medium" include memory space and any type of storage device accessible by a processor.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for enhancing data communications between a sender and a receiver connected to a network, the method comprising:
   transmitting a plurality of data packets from the sender to the receiver over the network;
   setting a PUSH bit in one data packet amongst the plurality of data packets to indicate the one data packet is a last packet out of the plurality of data packets;
   sending an acknowledgement message to confirm receipt of the one data packet;
   advertising an amount of available space in a receiving buffer, in response to receiving the one data packet; and the method further advertising the amount of available space in the receiving buffer to the sender concurrently with sending the acknowledgement message, the receiving buffer comprising one or more receive buffers posted by a receiving application excluding buffers returned to the receiving application, wherein the returned buffers store the plurality of data packets.

2. The method of claim 1, further comprising:
   advertising an amount of available space in the receiving buffer to the sender prior to the transmission of the plurality of data packets, the receiving buffer comprising one or more receive buffers posted by a receiving application.

3. The method of claim 1, wherein the returned buffers include a partially-filled buffer.

4. The method of claim 1, further comprising:
   storing the plurality of data packets into one or more receive buffers posted by a receiving application.

5. The method of claim 1, further comprising:
   determining from the PUSH bit whether a received packet is the last data packet.

6. The method of claim 5, further comprising:
   upon the determination that the received packet is the last data packet, returning one or more receive buffers to a receiving application and generating the acknowledgment message at the receiver.

7. The method of claim 1, wherein the sender comprises a network interface controller (NIC) configured for establishing a network connection with the receiver and posting transmit buffers on the network connection, wherein the NIC is configured for sending data from the transmit buffers to the receiver and returning the transmit buffers to a sending application upon completion of sending the data therein.

8. The method of claim 1, wherein the receiver comprises a network interface controller (NIC) configured for establishing a network connection with the sender and posting receive buffers on the network connection, wherein the NIC is configured for receiving data from the sender and returning the receive buffers to a receiving application.

9. The method of claim 8, wherein the NIC is further configured for returning a partially-filled receive buffer upon receiving the last data packet with the PUSH bit set therein.

10. The method of claim 1, wherein the network is an Enhanced Ethernet.

11. The method of claim 1, wherein the network is a Storage Area Network (SAN).

12. A non-transitory computer-readable storage medium comprising computer-executable instructions, which, while executed, causes a sender to perform a method comprising:
 transmitting a plurality of data packets to a receiver over a network;
 setting a PUSH bit in one data packet amongst the plurality of data packets to indicate the one packet is a last data packet out of the plurality of data packets;
 receiving an acknowledgement message from the receiver that confirms receipt of the one data packet; and the method further comprising receiving the advertisement of the amount of available space in the receiving buffer concurrently with receiving the acknowledgement message, the receiving buffer comprising one or more receive buffers excluding buffers storing the plurality of data packets; and
 receiving an advertisement of an amount of available space in a receiving buffer, in response to the receiver receiving the one data packet.

13. The computer-readable storage medium of claim 12, the method further comprising:
 receiving an advertisement of an amount of available space in the receiving buffer prior to the transmission of the plurality of data packets, the receiving buffer comprising one or more receive buffers posted by a receiving application.

14. The computer-readable storage medium of claim 12, wherein the buffers storing the plurality of data packets include a partially-filled buffer.

15. The computer-readable storage medium of claim 12, the method further comprising:
 establishing a connection with another receiver on the network; and
 posting one or more transmit buffers over the connection, the transmit buffers storing the plurality of data packets.

16. A non-transitory computer-readable storage medium comprising computer-executable instructions, which, while executed, causes a receiver to perform a method comprising:
 receiving a plurality of data packets from a sender, the plurality of data packets including one data packet with a PUSH bit set therein indicating the one data packet is a last-packet out of the plurality of data packets;
 determining from the PUSH bit whether a received packet is the one data packet;
 upon the determination that the received packet is the one data packet, returning buffers storing the plurality of data packets to a receiving application, and sending an acknowledgment message that confirms receipt of the one data packet; and
 advertising an amount of available space in a receiving buffer, the receiving buffer comprising one or more receive buffers excluding the buffers storing the plurality of data packets, in response to receiving the one data packet.

17. The non-transitory computer-readable storage medium of claim 16, wherein the buffers storing the plurality of data packets include at least a partially-filled buffer.

18. The non-transitory computer-readable storage medium of claim 16, the method further comprising:
 returning a partially-filled receive buffer upon receiving the one data packet with the PUSH bit set therein.

19. The non-transitory computer-readable storage medium of claim 16, the method further comprising:
 establishing a network connection with another receiver or sender on the network; and
 posting the one or more receive buffers over the network connection.

20. A network interface controller for implementation in a network capable device, the network interface controller comprising:
 one or more elements of the network interface controller configured for:
 establishing a first network connection between the network capable device and a receiver over a network;
 posting transmit buffers on the first network connection for a sending application in the network capable device;
 transmitting a first plurality of data packets from the transmit buffers to the receiver over the network;
 setting a first PUSH bit in one data packet amongst the first plurality of data packets to indicate the one data packet amongst the first plurality of data packets is a last data packet out of the first plurality of data packets;
 receiving a first acknowledgement message that confirms receipt of the one data packet amongst the first plurality of data packets; and
 receiving an advertisement of an amount of available space in a first receiving buffer, in response to the receiver receiving the one data packet.

21. The network interface controller of claim 20, the one or more elements further configured for:
 upon receiving the first acknowledgement message, resuming data transmission to the receiver.

22. The network interface controller of claim 20, the one or more elements further configured for:
 establishing a second network connection between the network capable device and a sender on the network;
 posting receive buffers on the second network connection for a receiving application in the network capable device; and
 advertising an amount of available space in a second receiving buffer to the sender over the network.

23. The network interface controller of claim 22, the one or more elements further configured for:
 receiving a second plurality of data packets from the sender and storing the second plurality of data packets in the second receiving buffer.

24. The network interface controller of claim 23, the one or more elements further configured for:
 for each received data packet from the second plurality of data packets, determining whether a second PUSH bit is set therein indicating the received data packet is a last data packet out of the second plurality of data packets; and
 upon the determination that the received packet is the last data packet out of the second plurality of data packets, returning one or more of the receive buffers that store the received second plurality of data packets to the receiving application and sending a second acknowledgment message that confirms receipt of the second plurality of data packets.

25. The network interface controller of claim 24, the one or more elements further configured for:
concurrently with sending the second acknowledgement message, advertising the amount of available space in the second receiving buffer to the sender, the second receiving buffer comprising the receive buffers minus the returned one or more receive buffers.

26. The network interface controller of claim 24, wherein the returned one or more receive buffers include a partially-filled receive buffer.

27. A host computer system connected to a network, the system comprising:
a host processor configured to execute one or more host applications;
a host memory accessible to the host processor, the host memory comprising a plurality of data buffers; and
a network interface controller coupled to the host processor, the network interface controller configured to enable a network connection between the host computer system and the network, one or more elements of the network interface controller configured for:
posting transmit buffers for a sending application in the host computer system;
transmitting a plurality of data packets from the transmit buffers to a receiver over the network;
setting a PUSH bit in one data packet amongst the plurality of data packets to indicate the one data packet is a last data packet out of plurality of data packets;
receiving a first acknowledge message that confirms receipt of the one data packet; and
receiving a first advertisement of an amount of available space in a first receiving buffer, in response to the receiver receiving the one data packet.

28. The host computer system of claim 27, the one or more elements of the network interface controller further configured for:
upon receiving the first acknowledgement message, resuming data transmission to the receiver.

29. The host computer system of claim 27, the one or more elements of the network interface controller further configured for:
posting receive buffers for a receiving application in the host computer system;
advertising the receive buffers to a sender over the network;
receiving a second plurality of data packets from the sender and storing the second plurality of data packets in the receive buffers;
for each received data packet, determine whether a second PUSH bit is set therein indicating the data packet is a last data packet out of the second plurality of data packets; and upon the determination that the received packet is the last data packet, returning one or more of the receive buffers that store the received data packets to the receiving application and sending a second acknowledgment message that confirms receipt of the second plurality of data packets from the sender.

30. The host computer system of claim 29, the one or more elements of the network interface controller further configured for:
concurrently with sending the second acknowledgement message, advertising an amount of available space in a second receiving buffer to the sender, the second receiving buffer comprising the receive buffers minus the returned one or more receive buffers.

31. The host computer system of claim 29, wherein the network interface controller is further configured to notify the host processor upon returning the one or more receive buffers that store the received data packets to the receiving application.

32. The host computer system of claim 27, wherein the network interface controller is further configured to notify the host processor upon completion of transmitting the data packets.

33. The host computer system of claim 27, wherein the network interface controller is further configured to post one or more small buffers for storing excess data.

34. A method for enhancing data communications between a sender and a receiver connected therewith via a network, the method comprising:
transmitting a plurality of data packets from the sender to the receiver over the network, wherein the plurality of data packets are received in a few buffers to be returned to the receiving application;
setting a PUSH bit in one data packet amongst the plurality of data packets to indicate the one data packet is a last data packet out of plurality of data packets; and
advertising an amount of available space in a receiving buffer, the receiving buffer comprising one or more receive buffers posted by the receiving application excluding the few buffers returned to the receiving application, in response to receiving the one data packet,
wherein the amount of available space advertised in response to receiving the one data packet is advertised concurrently with sending an acknowledgement message of receiving the data packets.

35. The method of claim 34, wherein the returned buffers include a partially-filled buffer.

36. The method of claim 34, further comprising:
in response to receiving the acknowledgement message, continuing to transmit data packets from the sender to the receiver.

* * * * *